Nov. 29, 1955  H. A. SMITH  2,724,942
HARVESTER REEL
Filed July 20, 1953  2 Sheets-Sheet 1
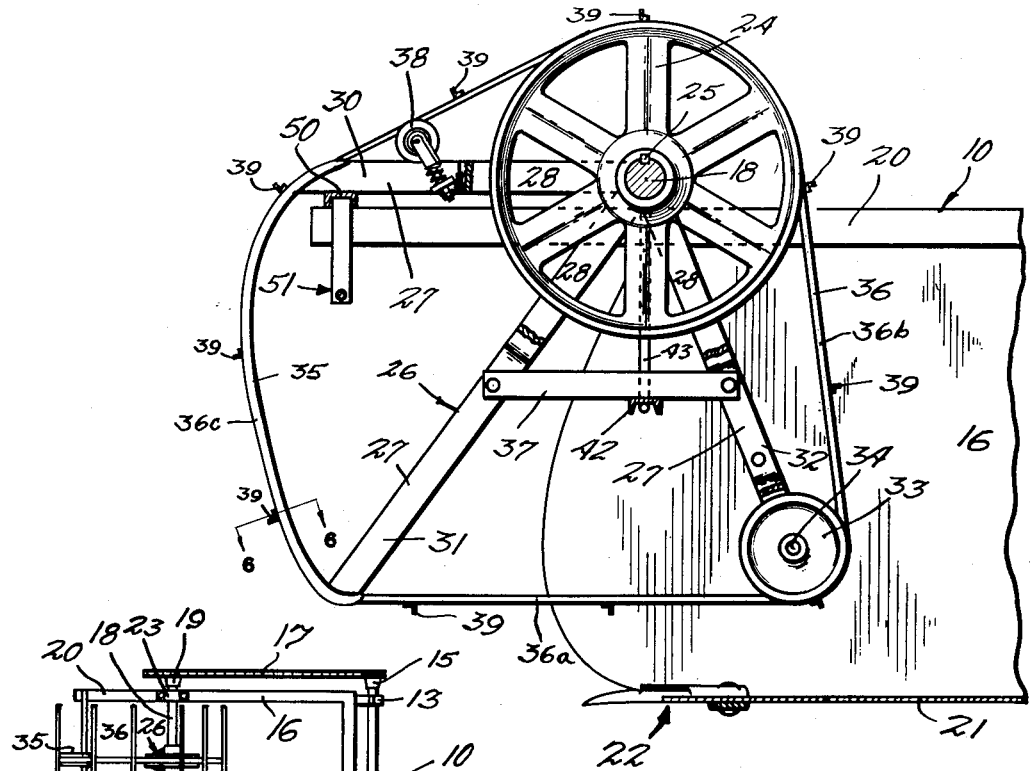
FIG-2
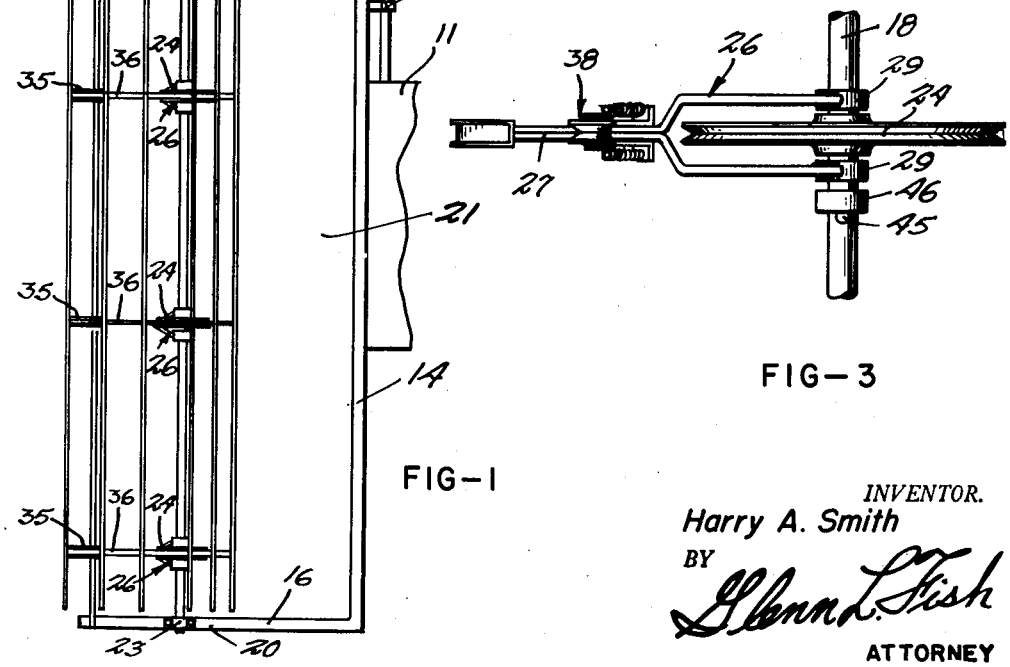
FIG-1
FIG-3
INVENTOR.
Harry A. Smith
BY
ATTORNEY Nov. 29, 1955
H. A. SMITH
2,724,942
HARVESTER REEL
Filed July 20, 1953
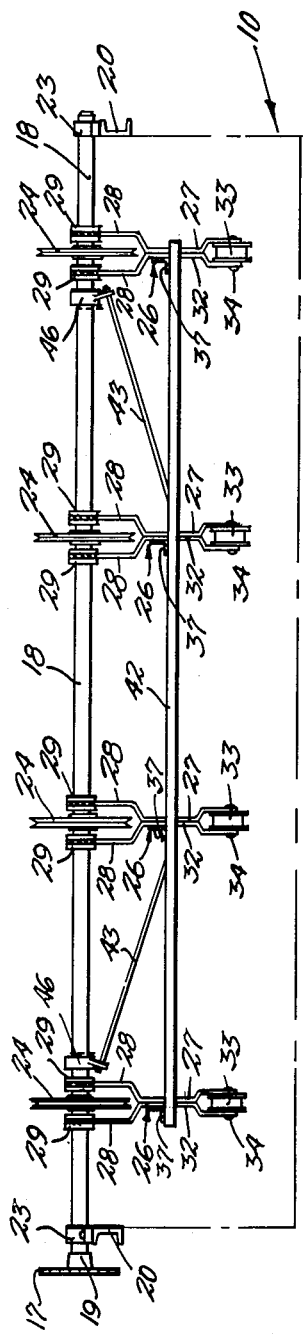
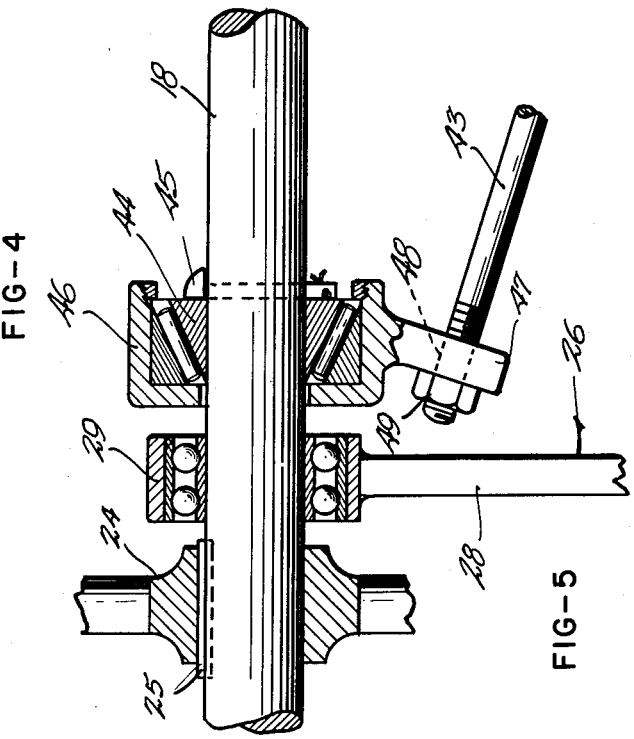
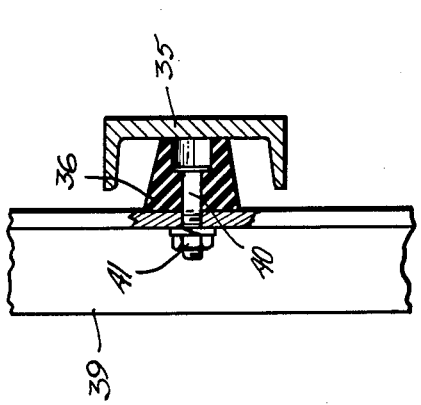
INVENTOR.
Harry A. Smith
BY
Glenn L. Fish
ATTORNEY United States Patent Office 2,724,942
Patented Nov. 29, 1955

2,724,942
HARVESTER REEL
Harry A. Smith, Mondovi, Wash.
Application July 20, 1953, Serial No. 368,872
1 Claim. (Cl. 56—219)

This invention relates to agricultural machines and more particularly to harvester reels for headers of machines commonly known as combines.

One object of the invention lies in the provision of a harvester reel having bats movable about an eccentric path axially parallel with the cutter bar of the header and providing construction whereby the flights of said path may be disposed to traverse any desired predetermined route and therefore provide a more effective header for harvesters.

Another object of the invention lies in the provision of a device of this character including endless flexible power transmission means adapted to be driven about a predetermined path and carrying the bats about the path in axially parallel relation with the drive shaft spaced above said cutter bar of the header.

Another object of the invention lies in the provision of a harvester reel which is adapted to carry the bats in a path so as to avoid throwing the cut grain over the back of the header.

Another object of the invention lies in the provision of a harvester reel which more efficiently holds the grain to the cutter bar of the header.

Another object of the invention is to generally improve harvester reels.

These and other objects of the invention will become apparent during the course of the following description.

In the accompanying drawings, forming a part of this specification, and in which like numerals are employed to designate like parts:

Figure 1 is a plan view of a header including my improved harvester reel;

Figure 2 is a vertical transverse cross section taken through the improved reel and the forward portion of the header;

Figure 3 is a fragmentary plan view of the improved reel showing a driving wheel with relation to a spider;

Figure 4 is a vertical longitudinal cross section taken through the harvester reel;

Figure 5 is a fragmentary enlarged vertical longitudinal cross section showing a portion of the driven shaft and elements associated therewith; and Figure 6 is a fragmentary cross section taken as at line 6—6 of Figure 2.

In Figure 1, I have shown the header, indicated in general by the numeral 10, as being supported at the forward end of a throat 11 of a self propelled combine (not shown). It will be understood, however, that the header may be of other types and construction and it is not my intention to limit the use of my invention to any particular type of header.

A power shaft 12 is supported in spaced bearings 13—13 secured to the rear wall 14 of the header 10 and is provided with a sprocket 15 at its outer end disposed a distance beyond one of the end walls 16 of the header 10. A flexible chain 17 transmits rotary motion from the power shaft 12 to the driven shaft 18 through a second sprocket wheel 19 secured upon the end thereof. Forwardly extending channel iron beams 20 are secured at the upper edge of the end walls 16 and extend beyond the forward marginal edge of said end walls. The header is provided with a bottom wall 21 having the usual cutter bar 22 of the reciprocating sickle type at its forward edge. A draper or other conveying means (not shown) may be supplied in the header to carry the cut grain to the throat 11 from whence it is carried into the combine.

The driven shaft 18 is journaled adjacent to each end in bearings 23 supported on beams 20 and the shaft 18 extends longitudinally of the header 10 spaced vertically above the cutter bar 22.

Fixed on shaft 18, in spaced relation relative to each other, I have provided drive wheels 24 which are here shown to be V-belt pulleys keyed as at 25. It is not my intention to limit the scope of my invention to V-belt pulleys and any type of drive wheel including flat belt wheels, chain sprockets, and the like are included in the analogous term "drive wheel."

As opposed to conventional harvester reels having spiders fixed to their drive shaft, I provide guide means or spiders 26 which have radially extending arms 27 provided with bifurcated inner ends having spaced fingers 28 disposed in straddling relation to the drive wheels 24 and welded or otherwise secured to bearings 29 rotatably encircling and journaled on the drive shaft 18. As indicated in Figure 2, each guide means or spider 26 is provided with three arms 27, a forwardly extending horizontal arm 30, an intermediate arm 31 depending at a forward incline, and a rear arm 32 depending at a rearward incline. The rear arm 32 is provided with a bifurcated lower end and an idler pulley 33 is journaled on a pin 34 carried by the bifurcated lower portion with the pulley disposed therein.

Upper arm 30 and intermediate arm 31 are provided with a forwardly open channel slide or guide means 35 which is adapted to receive and guide an endless belt or flexible power transmission means 36 over a predetermined path of movement indicated by the flights 36a, 36b, and 36c. The channel slide is shaped in an erratic arc to receive the transmission means 36 from the drive wheel 24 and discharge the transmission means in a horizontal flight 36a disposed in upwardly spaced near relation to the cutter bar 22. The channel slide 35 is welded or otherwise secured to the free ends of the arms 30 and 31 and serves the dual purpose of guiding the forward flight 36b of the power transmission means 36 and also bracing the guide means or spider 26. The rear arm 32 is secured in relative position to the arms 30 and 31 by means of a brace 37 secured therebetween.

If desired, the bar 50 may be provided with flanges disposed in a vertical plane parallel with the end walls 16 and these flanges may bolt to the beams 20 to permit adjustment of the bar 50 below the beams 20 if found desirable.

It may thus be seen that the power transmission means 36 has a horizontal flight 36a which progresses rearwardly over the cutter bar 22 to cause the bats 39 to hold the grain to the cutter bar as the header moves forwardly therethrough and immediately after accomplishing this function the power transmission means makes a sharp bend upwardly and passes through a substantially vertical flight 36c to the drive wheel 24.

In the present type of reels common in harvesting machines wherein the bats are carried at the ends of rigid spiders, it is found that the bats traversing a circle are inclined to throw the cut heads and stalks over the back wall of the header. With the construction shown in the present disclosure, this undesirable effect is eliminated.

A spring loaded idler 38 is carried by the upper arm 30 and exerts outward pressure on the power transmission means 36 to maintain it in taut condition to prevent it from sagging in its horizontal flight 36a.

Longitudinally extending bats 39 comprising lightweight angle metal are secured to the power transmission means in any suitable manner here shown as by the means of a bolt 40 and clamping nut 41. The bats extend longitudinally parallel with the driven shaft 18 and are fixed to the power transmission means 36 in spaced relation to each other along their endless lengths; therefore, as the power transmission means is rotated the bats will traverse an endless eccentric path commensurate with the path of the power transmission means.

To support the shaft 18 against sagging and to rigidly fix the spiders 26, I fasten a truss bar 42 to the braces 37 of the spiders 26 and provide angle braces 43 secured at their inner ends to the truss bar 42 and at their outer ends being journaled on the shaft 18. The structure shown for the truss braces 43 is detailed in Figure 5 and shows a radial-thrust bearing 44 secured against inward longitudinal movement along the shaft 18 by means of a pin 45 and is carried in a housing 46 having an angularly depending ear 47 bored at 48 to receive the end of the truss brace 43 which is secured therein by means of a cooperating nut 49. Tightening of the nuts 49 will provide end pull on the angle braces 43 and support the center portion of the truss bar 42 and therefore, the shaft 18 through the spiders 26.

The construction thus far described permits the united spiders 26 to rotate about the shaft 18. To prevent this, we provide a second longitudinally extending bar 50 which secures to the outer ends of the beams 20 and extends under the upper arms 30 to support the spiders 26 against rotation. Obviously the arms 30 may be adjusted with relation to the bar 50 to change the relative flight position above the cutter bar 22. A second truss mechanism indicated in general by the numeral 51 supports the bar 50 against sagging.

In practical use of the invention, I have found that with the flight 36a above the cutter bar 22 moving rearwardly in a substantially horizontal plane, the reel functions very well when cutting wheat. Adjustments may be found to be desirable when cutting other crops.

Having thus described my invention, I claim:

In a reel for headers having a cutter bar, a power driven shaft journaled on the header and upwardly spaced and axially parallel to the longitudinal axis of said cutter bar; a plurality of drive wheels fixed on said shaft in spaced relation to each other; spiders journaled on and supported by said shaft, one coincident to each said drive wheel; guide means carried by said spiders spaced from said shaft; a truss rod journaled at its ends on the end portions of said shaft and operably associated with said spiders to support said shaft; endless flexible power transmission means trained about each said spider guide means and driven by its companion drive wheel and disposed to present a substantially horizontal flight of said transmission means in near upwardly spaced relation and at right angles to the axis of said cutter bar; means releasably securing said spiders in fixed relation to the header circumferentially of said driven shaft; and bats fixed to said transmission means in parallel relation to said shaft and movable thereby about the path defined by said transmission means.

References Cited in the file of this patent

UNITED STATES PATENTS

| 357,662 | Giles | Feb. 15, 1887 |
| 532,320 | Fulton | Jan. 8, 1895 |
| 704,445 | Dunahoo | July 8, 1902 |
| 2,317,127 | Bowling | Apr. 20, 1943 |
| 2,454,063 | Irvine | Nov. 16, 1948 |

FOREIGN PATENTS

| 14,828 | Australia | Nov. 19, 1934 |